(12) United States Patent
Leblond

(10) Patent No.: US 9,918,046 B2
(45) Date of Patent: *Mar. 13, 2018

(54) PEER TO PEER SURVEILLANCE ARCHITECTURE

(71) Applicant: Leverage Information Systems, Inc., Woodinville, WA (US)

(72) Inventor: Raymond G. Leblond, Riverside, CA (US)

(73) Assignee: Leverage Information Systems, Inc., Woodinville, WA (US)

( * ) Notice: Subject to any disclaimer, the term of this patent is extended or adjusted under 35 U.S.C. 154(b) by 3 days.

This patent is subject to a terminal disclaimer.

(21) Appl. No.: 15/394,751

(22) Filed: Dec. 29, 2016

(65) Prior Publication Data

US 2017/0104962 A1 Apr. 13, 2017

Related U.S. Application Data

(63) Continuation of application No. 14/622,434, filed on Feb. 13, 2015, now Pat. No. 9,661,276, which is a continuation of application No. 12/154,477, filed on May 23, 2008, now Pat. No. 9,035,768.

(51) Int. Cl.
*H04N 7/18* (2006.01)

(52) U.S. Cl.
CPC .................................. *H04N 7/181* (2013.01)

(58) Field of Classification Search
CPC ............ G08B 13/19697; G08B 25/008; G08B 25/009; G08B 13/19656; G08B 25/10; G08B 13/19695; G08B 13/19645; H04N 7/181

See application file for complete search history.

(56) References Cited

U.S. PATENT DOCUMENTS

| 5,168,019 A * | 12/1992 | Sugeno ................ H01M 10/05 429/231.95 |
| 5,854,902 A * | 12/1998 | Wilson .............. G06F 17/30017 340/541 |
| 5,974,236 A | 10/1999 | Sherman |
| 6,542,076 B1 * | 4/2003 | Joao ...................... B60R 25/018 307/10.2 |

(Continued)

*Primary Examiner* — James Yang
(74) *Attorney, Agent, or Firm* — Lowe Graham Jones PLLC

(57) ABSTRACT

A peer to peer surveillance architecture comprising a plurality of independent nodes for capturing, analyzing, storing, and viewing surveillance information is disclosed. The surveillance architecture has no central controller or single point of failure because of the peer to peer or independent relationship between its nodes. Generally, surveillance information of various types is captured by one or more capture nodes and transmitted to or one or more viewing, content storage, or server nodes for display, analysis, storage, or a combination thereof. Server nodes may provide authentication services to validate user or device credentials prior to granting access to surveillance information. In one or more embodiments, specialized video compression hardware is provided to allow high quality video surveillance information to be transmitted across low bandwidth connections. Compression may also be performed on other types of surveillance information.

21 Claims, 5 Drawing Sheets

(56) References Cited

U.S. PATENT DOCUMENTS

| | | | |
|---|---|---|---|
| 6,661,340 B1* | 12/2003 | Saylor | G08B 25/016 340/3.3 |
| 6,735,630 B1 | 5/2004 | Gelvin et al. | |
| 7,015,806 B2* | 3/2006 | Naidoo | G08B 13/19656 340/506 |
| 7,389,526 B1 | 6/2008 | Chang et al. | |
| 7,697,420 B1* | 4/2010 | Garahi | H04L 45/00 370/229 |
| 7,719,415 B2* | 5/2010 | Dahl | G08B 25/14 340/506 |
| 2004/0113784 A1* | 6/2004 | Henderson | H04N 7/18 340/568.1 |
| 2004/0148518 A1 | 7/2004 | Grundback et al. | |
| 2006/0050642 A1* | 3/2006 | Chini | H04B 3/542 370/241 |
| 2006/0176834 A1* | 8/2006 | Dickerson | G08B 13/19656 370/260 |
| 2007/0076094 A1 | 4/2007 | Dickerson et al. | |
| 2007/0150565 A1* | 6/2007 | Ayyagari | H04L 67/12 709/223 |

* cited by examiner

PEER TO PEER SURVEILLANCE ARCHITECTURE

PRIORITY CLAIM

This is a continuation of U.S. application Ser. No. 14/622,434 filed Feb. 13, 2015; which is a continuation of U.S. application Ser. No. 12/154,477 filed May 23, 2008, now U.S. Pat. No. 9,035,768 issued May 19, 2015 the contents of which applications are hereby incorporated by reference in their entireties.

FIELD OF THE INVENTION

The invention relates to surveillance systems, particularly to a peer to peer surveillance architecture capable of capturing and providing video, audio, and other information.

BACKGROUND OF THE INVENTION

Surveillance is widely utilized in modern society. Governments, corporations, groups, and even individuals use surveillance to promote public safety and to deter and prevent crime as well as for general monitoring.

Traditional surveillance systems generally provide audio and video monitoring through an interconnected hierarchical system. For example, a closed-circuit television (CCTV) system may provide video monitoring through a set of closed-circuit cameras connected to a single stand alone aggregation device where the video feeds from the cameras are sent. The captured information may then be viewed through the aggregation device such as on one or more video screens.

To function properly, a CCTV or other similar traditional system requires a central controller or device which accepts signals from cameras and which may also provide control instructions to the devices. This allows every camera to be monitored and controlled from a single location. However, this introduces a single point of failure in that the failure of the central controller would render the entire surveillance system inoperative. Thus, such systems are said to be fragile as a failure of the central controller or the connections between the controller and the cameras either impairs or completely prevents the surveillance system from functioning. This fragility is highly undesirable in a surveillance system especially where public safety is concerned.

With the introduction of digital and networked devices, surveillance cameras could be connected via standard wired or wireless network connections. This was an improvement in that one or more standard network connections could be used by capture devices rather than a specialized, dedicated, or proprietary video connection. In addition, digital video may be sent across vast distances through digital networks, such as the Internet, which was not possible without great expense using traditional CCTV systems.

However, network based surveillance systems continue to rely on a centralized controller to function. The video or other surveillance information is still aggregated at the centralized controller which facilitates observation and analysis of the information gathered. Thus, the single point of failure has remained through the transition from traditional CCTV and similar systems to network based surveillance systems.

It is true that these traditional systems may be configured to have backup central controllers. While these backup systems provide increased reliability they do so at increased cost and often do not provide a seamless transition from the failed equipment to its associated backup device. In surveillance, any downtime including downtime associated with switching to a backup device is highly undesirable.

Traditional systems are also difficult to update for new circumstances or environments. For example, moving one or more cameras to a new location or including additional cameras or other collection devices requires installation of at least one connection from each camera or collection device to the central controller. These connections are often physical connections, such as network or coaxial cabling, which are difficult to install especially in existing structures.

Thus, what is desired and disclosed herein is a peer to peer surveillance architecture having no single point of failure that is easy to deploy and update as desired.

SUMMARY OF THE INVENTION

A peer to peer surveillance architecture comprising a plurality of peer to peer nodes is disclosed. In one embodiment, one or more of the peer to peer nodes are capture nodes having one or more capture devices, server nodes configured to authenticate access to surveillance information, and viewing nodes having at least one screen. The capture nodes generally capture surveillance information which is communicated between one or more of the plurality of independent nodes through one or more communication links. For example, a capture device may be a camera in one or more embodiments. The camera may be configured to capture images, video, audio or a combination thereof.

The plurality of peer to peer nodes may include at least one server node, at least one content storage node, or both, and the server nodes may be configured to analyze surveillance information, authenticate access to surveillance information, or both. In addition, the one or more capture nodes or the one or more server nodes may be configured to analyze surveillance information to detect one or more events and transmit one or more notifications if any of these events are detected.

Surveillance information may be communicated by unicast, multicast, or broadcast between one or more of the plurality of nodes through a virtual matrix switch. Generally, the virtual matrix switch comprises one or more communication links, one or more networks, or both. In addition, the plurality of nodes may be configured to communicate surveillance information via IP through the one or more communication links. It is contemplated that surveillance information may be compressed and decompressed by one or more of the plurality of nodes.

In one or more embodiments a peer to peer surveillance node comprises one or more processors, a memory, one or more transceivers, and an enclosure. Each of the one or more transceivers may be configured to communicate surveillance information through one or more communication links. Because the surveillance architecture is a peer to peer design, the surveillance information is communicated with other peer to peer surveillance nodes without use of a central control system. The enclosure may have a continuous rigid structure to support each of the one or more components of the peer to peer surveillance node.

A surveillance node may include one or more transceivers which communicate surveillance information via IP through one or more communication links. In addition, a surveillance node may have one or more transceivers that are cellular transceivers or satellite transceivers, and surveillance information may be compressed, decompressed, or both by a node's processor or processors.

Some surveillance nodes may include one or more storage devices where at least a portion of the storage space on the storage device or devices is used to store surveillance information. Other surveillance nodes may include one or more capture devices where each capture device captures one or more types of surveillance information. For example, one or more of the capture devices may be a camera configured to capture video or video and audio.

The surveillance information may be viewed as well. Thus, one or more surveillance nodes may include one or more screens to display surveillance information. Also, one or more control interfaces may be provided to control the display of surveillance information on the one or more screens. For example, signals from the operation of the one or more control interfaces may control how surveillance information is displayed or at what rate surveillance information is displayed.

In one or more embodiments a surveillance node may include one or more power sources. A power source may be used to power the node not connected to an electrical grid. It is contemplated that the one or more power sources may be rechargeable, refuelable, or both.

A method of collecting surveillance information is provided herein as well. The method, in one embodiment, comprises arranging a plurality of peer to peer surveillance nodes to collect surveillance information from at least one target area; collecting one or more types of surveillance information through the one or more capture devices; communicating the one or more types of surveillance information between one or more of the plurality of peer to peer surveillance nodes; and viewing, storing, and analyzing the one or more types of surveillance information on one or more of the plurality of peer to peer surveillance nodes. The plurality of peer to peer surveillance nodes may comprise one or more processors, a memory, and one or more transceivers, with at least one of the plurality of peer to peer surveillance nodes further comprising one or more capture devices, and with at least another of the plurality of peer to peer nodes configured to authenticate access to the surveillance information. In one embodiment, the one or more capture devices is a camera. Further, it is contemplated that one or more of the plurality of peer to peer nodes may include one or more power sources.

In some embodiments, arranging the plurality of peer to peer surveillance nodes may include configuring one or more of the one or more transceivers to communicate through at least two independent communication links. In addition, arranging the plurality of peer to peer surveillance nodes may also include deploying at least two of the plurality of peer to peer nodes to collect surveillance information from the same target area or areas.

Generally, communication by a node occurs through its transceiver or transceivers. In some nodes at least one of its one or more transceivers is a cellular transceiver, a satellite transceiver, or both. It is contemplated that communicating the one or more types of surveillance information may occur via IP.

As with the above, the one or more types of surveillance information may be compressed to form one or more types of compressed surveillance information. This compressed surveillance information may be communicated between one or more of the plurality of nodes. Also, the compressed surveillance information may be decompressed prior to the step of viewing, storing, or analyzing the surveillance information contained within the compressed surveillance information.

In some embodiments, the method of collecting surveillance information includes analyzing surveillance information to detect one or more events and communicating one or more notifications if an event or events is detected.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

Preferred and alternative examples of the present invention are described in detail below with reference to the following drawings.

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENT

Figure 1:
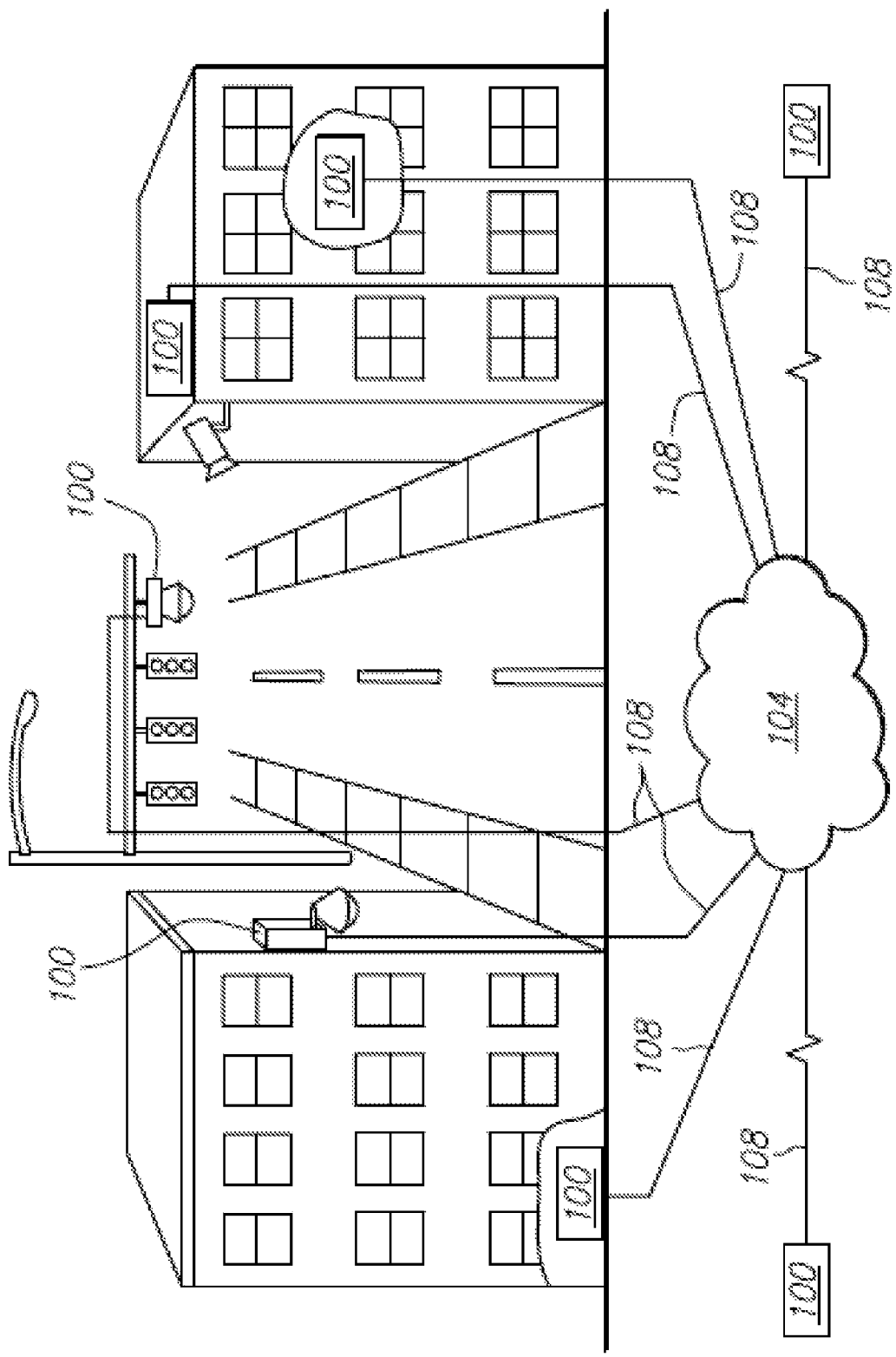
FIG. 1 illustrates an example embodiment of the peer to peer surveillance architecture as it may be deployed.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Generally, the peer to peer surveillance architecture comprises one or more nodes configured to capture, analyze, store, and present surveillance information. As discussed further below, surveillance information comprises a wide variety of information including video and audio. As used herein, peer to peer means that each node within the surveillance architecture operates such that it is not dependent on (i.e. does not rely on) its peer nodes. This allows the surveillance architecture to have no single point of failure making it extremely robust. The failure of or damage to individual nodes, components, or communication links cannot cause the system to function at less than full capacity when a peer to peer or non-dependent relationship exists between each node and its peers.

The surveillance architecture may be configured to balance requirements and capability. For example, the architecture may be configured for a high or complete redundancy, but may also be configured according to particular requirements based on the necessary functionality, redundancy, and budget considerations.

As will be described further below, the peer to peer surveillance architecture generally comprises one or more capture nodes, server nodes, content storage nodes, and viewing nodes. The capture nodes generally record or capture surveillance information and may be configured to capture specific types of information, such as a camera node which captures video surveillance information. The captured information may be viewed, stored, or analyzed by the other nodes, including other capture nodes. The architecture is able to provide complete redundancy through these nodes, which are configured to function without depending on any other node or any single communication link.

The peer to peer surveillance architecture combines this redundancy with high adaptability and easy deployment, both of which are among the advantages over traditional surveillance systems. This allows collection of surveillance information from a wide range of target areas and is generally made possible through various wireless, cellular, and other network technologies, and allows for stationary and mobile surveillance systems that may be rapidly deployed virtually anywhere as desired. For example, the architecture allows capture nodes to be mounted on buildings, utility poles, in jails, in parks, throughout downtown areas, and intersections even where there are no physical communication links such as network or other cables.

The advantages of the peer to peer surveillance architecture's reliability and adaptability can be readily seen with regard to public safety. Surveillance enhances public safety and security by allowing police and other security agencies or organizations to monitor citizen safety, specific events, congestion, and even fight graffiti. In addition, surveillance serves as a force multiplier, allowing for example, police or municipalities to expand their coverage without additional officers. Thus, the architecture's reliability ensures reliable surveillance for these purposes, and its adaptability allows rapid deployment to monitor special events, such as but not limited to sporting events or conventions as well as the ability to quickly and easily remove surveillance once the event is over.

The peer to peer surveillance architecture may also provide analysis of surveillance information. This greatly expands surveillance capabilities without the need for increased personnel as well. For example, the architecture may provide automated license plate recognition, theft detection, and traffic congestion monitoring. The architecture may provide notifications to users or to nodes within the architecture when certain events are present or detected in the surveillance information.

The peer to peer surveillance architecture will now be described with regard to FIGS. 1-7. FIG. 1 illustrates an exemplary embodiment of the surveillance architecture deployed in an urban setting. In one embodiment, the surveillance architecture comprises one or more nodes 100 communicating through a network 104 via one or more communication links 108.

The network 104 allows communication between one or more nodes 100 to occur and may be any type of communication network or path now know or later developed. The network 104 may comprise various communication links 108 including wired and wireless links and utilize various communication protocols. In one embodiment, the network 104 is a packet switched network such as an Internet Protocol (IP) network. Any packet based communication protocol, known or later developed, may be used. This includes connection based protocols such as Transmission Control Protocol (TCP), frame relay, and Asynchronous Transfer Mode (ATM). This also includes connectionless protocols such as User Datagram Protocol (UDP). It is contemplated that the network 104, or a portion of it, may also be a circuit switched network in one or more embodiments and that communications between nodes may be encrypted, such as through one or more Virtual Private Networking (VPN) connections to secure communications across the network.

Each node 100 communicates through the network 104 via one or more communication links 108. The communication links 108 may each represent one or more independent communication links to a network 104 thus allowing each node 100 to have redundant communication links 108. The communication links 108 may be any communication link capable of carrying data now know or later developed. For example, the communication link 108 may comprise electrical, optical, or other cable. The communication link 108 may utilize physical layer topologies such as but not limited to Category 5 or 6, SM or MM fiber, DSL and Long Range Ethernet. The communication link 108 may also be a wireless communication link such as a cellular or other wireless link. Wireless communication links 108 may utilize physical layer topologies such as but not limited to 802.11a/b/g, WiMAX, EVDO, GPRS, Long Range Ethernet, and DSL as well as any other wireless protocol capable of carrying data now know or later developed. It is contemplated that these wireless connections or networks may operate across on one or more frequencies capable of supporting data communication such as cellular frequencies, the 4.9 GHz public safety frequency, licensed and unlicensed wireless (e.g. 70 GHz and 90 GHz), 2.4 GHz, and 5.8 GHz, and other microwave and satellite communication frequencies among others. Wireless connections may also comprise optical wireless connections, such as a laser or other light based communication. It is noted that, as described regarding the network 104, any communication protocol now know or later developed whether packet switched, circuit switched, connection based, connectionless, or otherwise may be used to facilitate communication via the communication link 108.

Figure 2A:
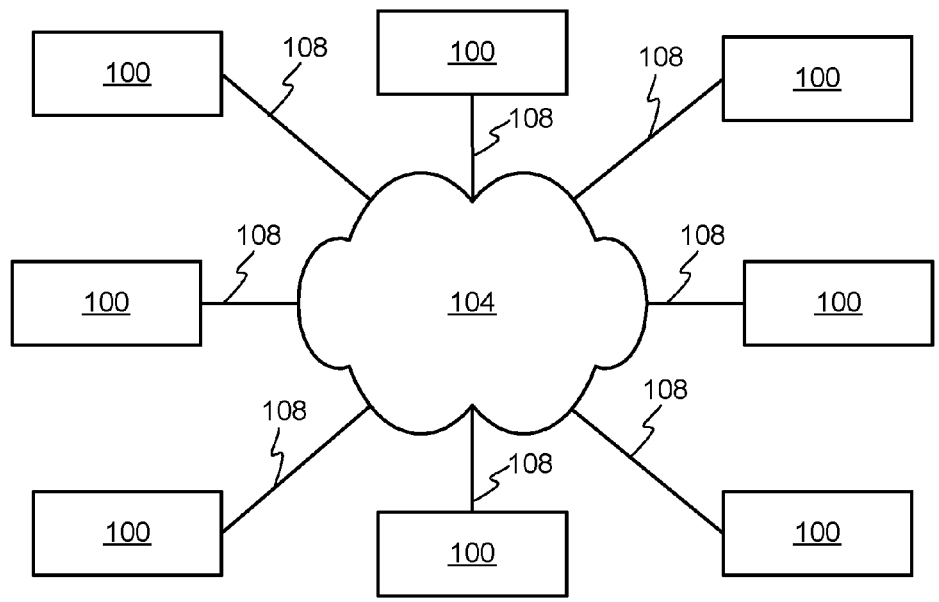
FIG. 2A is a block diagram illustrating an example embodiment of the peer to peer surveillance architecture where each node is connected through a network.
Figure 2B:
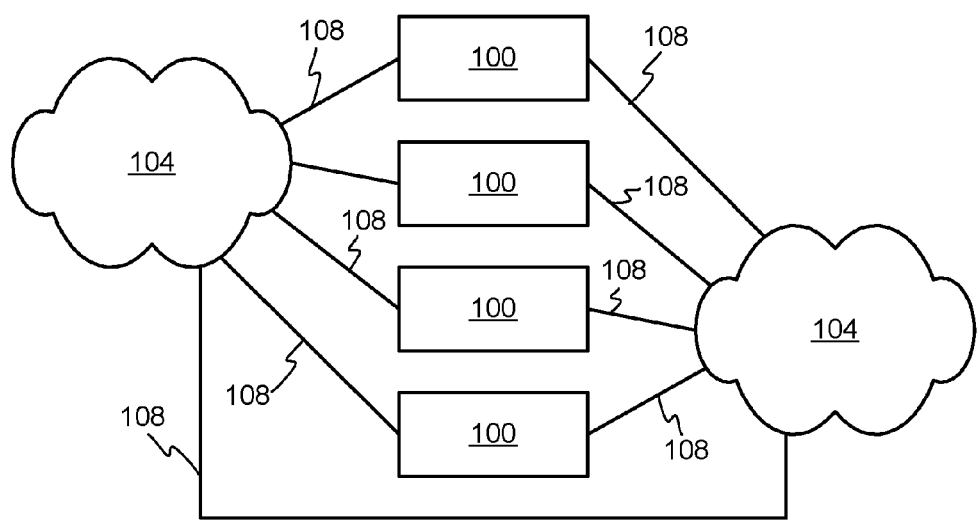
FIG. 2B is a block diagram illustrating an example embodiment of the peer to peer surveillance architecture where each node is connected through more than one independent network.

FIG. 2A is a block diagram illustrating an embodiment of the peer to peer surveillance architecture where each node is connected through one network, similar to the above. FIG. 2B is a block diagram illustrating an embodiment of the surveillance architecture where each node 100 is connected through more than one independent network 104. In addition, the networks 104 themselves may be connected by a communication link 108 as well. Thus, communications to and from each node 100 may be routed through a single network or both networks. The communication links 108 from each node 100 to each network 104 provide redundancy allowing the surveillance architecture to fully function even if one or more of the communication links 108 are not operational. In addition, as stated above, each communication link 108 may comprise one or more independent connections, as desired, further increasing the architecture's reliability.

Of course, a network 104 or networks may be configured in a multitude of ways as is well known in the art. In one or more embodiments, the network 104 may be a single switch or router such as in a local area network, or may include one or more switches, routers, and other devices, such as a wide area network or the Internet. It is noted that nodes 100 may also communicate directly through one another rather than through one or more other devices. For example, two nodes 100 may have a direct wireless connection between one another such as an ad hoc 802.11a/b/g connection or a direct cable connection. It is contemplated that the nodes 100 may communicate with a network through another node in one or more embodiments.

In one or more embodiments, each node 100 may be connected to every other node through a logical connection, such as for example, nodes connected to one another in an IP or other packet switched network. Generally, a logical connection may be thought of as the end to end connection which allows data from a source to reach its proper destination as it travels across one or more physical or wireless connections. The logical connections that allow communication between the nodes 100 of a surveillance system according to the invention herein may be referred to as a virtual matrix switch.

The virtual matrix switch allows surveillance information to be communicated between individual nodes 100, but also supports multicasting surveillance information to a plurality or all of the nodes regardless of the underlying physical or wireless connection type. When connected through a virtual matrix switch, each node 100 will be in a virtual or logical network with only its peer nodes in one or more embodiments. To illustrate, in one embodiment, each node 100 is connected to peer nodes by one or more networks and communication links. Though these networks and communication links may be public or private networks and communication links shared by other devices, the virtual matrix switch provides a virtual or logical network which only the nodes 100 are part of. Communications within the virtual matrix switch may be encrypted, such as through GRE tunneling or VPN connections, in some embodiments.

Figure 3:
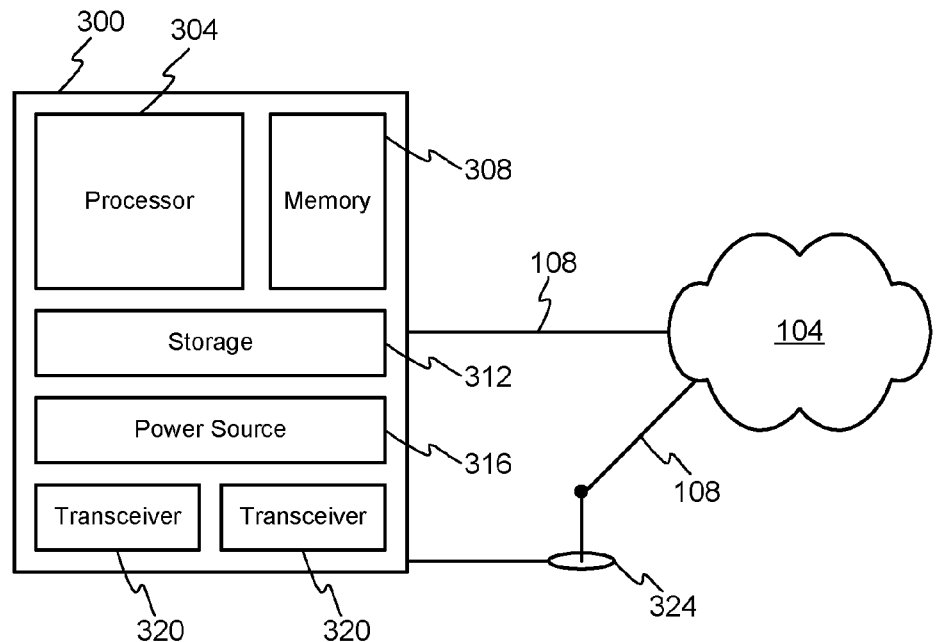
FIG. 3 is a block diagram illustrating an example embodiment of a node.

FIG. 3 illustrates an embodiment of a node 100. In one or more embodiments, a node 100 may comprise any combination of one or more processors 304, memory 308, and storage 312 that is capable of processing, and executing machine readable code from the memory 308, storage 312, or both in one or more embodiments. Generally, the processor 304 may be any device capable of executing machine readable code and transmitting and receiving data. The memory 308 and server storage 312 may be any data storage device or devices capable of storing data. The memory 308 and storage 312 will typically allow both reading and writing data, however, in some embodiments at least a portion or all of either the memory 308 or storage 312 may be read only. It is noted that in some embodiments, memory 308 or storage 312 alone will be sufficient to store any data or machine readable code required by the node 100 and that because of this, not all embodiments will require both memory 308 and storage 312.

In some embodiments, the machine readable code controls the operation of the nodes 100. The machine readable code may be one or more programs such as an operating system running one or more applications. The machine readable code may also provide compression and decompression of surveillance information as will be described below. In one embodiment, the machine readable code is configured to allow a node 100 to communicate by unicast, multicast, or broadcast over a virtual matrix switch.

In one or more embodiments, a node 100 comprises one or more transceivers 320 configured for two-way communication in that each transceiver may receive and transmit information or data to one or more other nodes 100 through one or more communication links 108, one or more networks 104, or a combination thereof. A transceiver may be configured to communicate by unicasting, multicasting, or broadcasting information through one or more wired or wireless connections. In some embodiments, one or more of the transceivers 320 may only transmit or only receive data. It is contemplated that a transceiver 320 may also communicate with other external devices as well as nodes 100.

In one or more embodiments, the one or more transceivers 320 may be connected to one or more communication links 108. As stated above, the communication links 108 may be physical or wireless links and may utilize one or more communication protocols.

Wireless links in one or more embodiments may also comprise a cellular link using various communication protocols. For example, a transceiver 320 may be configured to communicate through a TDMA, CDMA, FDMA, or other cellular network. A cellular communication link 108 allows for long range wireless communication and provides the advantage of network availability even in remote areas. Though cellular communication links 108 may have limited bandwidth, the invention provides data compression to overcome this limitation as will be discussed further below. It is contemplated that a wireless communication link 108 may comprise wireless communication with one or more satellites and that wireless communication may be accomplished through one or more antenna 324 if desired. The antenna 324 may be internal to the node 100 or may be an external antenna connected to the node 100.

As stated, each node 100 may have one or more communication links 108 for redundancy. This may be accomplished by configuring a node 100 with more than one transceiver 320, or by configuring a node with a single transceiver capable of having more than one communication link. Only one communication link 108 is necessary for communication, thus any additional communication links 108 may be used to increase available bandwidth such as by simultaneously utilizing all available communication links 108 to transmit data, receive data, or both. However, a node 100 may also be configured to utilize the additional communication links 108 only when the currently used link or links is damaged or fails. Also, a node 100 may be configured to choose which communication link 108 to use based on a predetermined order or based on the available bandwidth, latency, or other characteristic of the links.

It is contemplated that any combination of communication links 108 may be used by a single node 100. For example, a node 100 may have an IP communication link 108 through wired Ethernet, a cellular communication link, and a wireless 802.11 link simultaneously. One or more of these communication links 108 may be used simultaneously or may remain unused (i.e. inactive) unless one or more of the other links is damaged or fails.

In one embodiment, the nodes 100 communicate through a communication link 108 using IP based communication. IP networks are inherently reliable and may be configured to automatically route data through alternate links based on network congestion or availability. IP based communication also allows multicasting which may be used to reduce bandwidth utilization. In addition, a node 100 communicating via IP may communicate to or through any IP based device or network including the worldwide Internet. This allows nodes 100 to communicate around the world with very little expense. Thus, IP networks are well suited for a surveillance application, however, it is noted that the invention may be used with any type of network or communication protocol.

In one or more embodiments, a node 100 also comprises a power source 316. The power source 316 provides power to the node 100 so that it may be used without being connected to an electric power grid. The power source 316 may be any device capable of providing sufficient power for a node 100. Such devices include but are not limited to batteries, solar panels, wind turbines, and generators or a combination thereof. In one embodiment, a node 100 has a power source 316 comprising one or more batteries and a solar panel which recharges the batteries. In another embodiment, a generator is provided which may power to node 100 directly or be used to recharge any batteries the node may have. The generator or other power supply may be refueled periodically or as necessary to provide power. It can be seen that a node 100 with a power source 316 and a wireless communication link 108 may be quickly and easily deployed virtually anywhere.

Components of the nodes 100 such as the processor 304, memory 308, storage 312, or transceivers 320 may communicate with one another in one or more embodiments. In addition, the power supply 316 component may be configured to communicate power utilization, power reserves, battery condition, or other information in one or more embodiments. Components of the nodes 100 also include capture devices, screens, and control interfaces as will be described further below. It is contemplated that other devices may be components of a node 100 such as but not limited to one or more lights or speakers.

In one or more embodiments, communication between components takes place through one or more optical, electrical, or wireless data connections. These connections may allow unidirectional or bi-directional communication between the components. It is contemplated that in some embodiments, not every component will be connected to every other component. It is also contemplated, that one or more of the components may be in separate enclosures of a node 100.

In one embodiment, only the processor 304 is connected to the memory 308, storage 312, and one or more transceivers 320. In another embodiment, some components may be connected to more than one other component. For example, the one or more transceivers 320 may be connected to the memory 308, storage 312, or both, in addition to being connected to the processor 304. In this manner, the one or more transceivers 320 may utilize the memory 308, storage 312, or both without communicating with the processor 304. It is contemplated that in some embodiments, one or more components may communicate within the node through a connection with another component.

In some embodiments, the components described above may be "off the shelf" products from various manufacturers. For example, a node may be a computer having a processor 304, memory 308, storage 312, and one or more transceivers 320 installed on a motherboard. In other embodiments, the components may be provided by one or more independent "off the shelf" products. For example, the processor 304, memory 308, and storage 312 may be a computer or video processing device connected to an external camera, and one or more external transceivers 320. The processor 304 may be a stand alone video processor such as, for example, a device which accepts video as an input and compresses, analyzes or otherwise processes the video and outputs the result. The storage 312 may be comprise one or more stand alone storage devices such as, for example, a set of hard drives, a RAID array, or USB or Firewire storage. It is contemplated that there may be more than one of each component for redundancy. Where more than one of the same component is included in a node 100, it is contemplated that each may be used simultaneously or that one or more redundant components may remain inactive until needed.

It is contemplated that a node 100 may be located in mild environments and harsh or extreme environments (e.g. extreme heat, cold, moisture, or wind). Thus, each node 100 may be configured with various enclosures or structures capable of supporting its components. For example, a node 100 used indoors may have an enclosure as simple as an equipment rack or shelf. Alternatively, an indoor enclosure may fully enclose the components of a node 100 such as with a metal, plastic, or other rigid cover. A node 100 for outdoor use may have a more rugged enclosure such as by using stronger or thicker materials. In addition, some enclosures may have wind, water, ice, heat or other weather resistance. This may be accomplished by insulating the enclosure and by including one or more seals to prevent weather infiltration. Enclosures may include structures that do not fully enclose a node's components, and may include structures now known and later developed.

Generally, an enclosure will be a single continuous rigid structure which supports all the components of a node 100. Of course, in some embodiments, some components may not be supported or attached to an enclosure. For example, a camera may be attached directly to a wall rather than to an enclosure. In addition, some enclosures may have portions that may be removably attached to allow for repair or replacement. It is noted that, such enclosures are still considered to be a single continuous structure because each removably attached portion will be attached when the node is in operation.

Types of nodes according to the invention will now be described. These nodes may include the basic components of and be configured according to the various embodiments of the nodes 100 described above. In addition, the following nodes generally include additional components suited for one or more specific tasks in their various embodiments.

Figure 4:
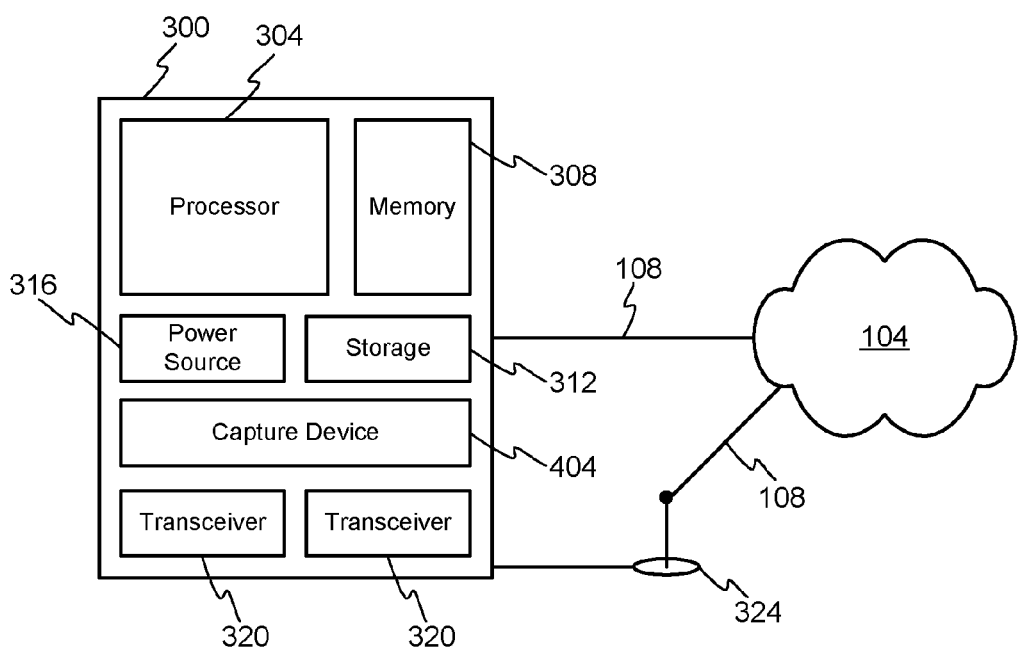
FIG. 4 is a block diagram illustrating an example embodiment of a capture node.

FIG. 4 illustrates an embodiment of a capture node 400 of the peer to peer surveillance system. Generally, a capture node 400 is a node configured to capture surveillance information from one or more target areas. A target area is generally an area where useful surveillance information may be gathered, but may be any area or location. Surveillance information may include video, audio, or both, as well as information from specific sensors such as voltage, current, temperature, radiation, motion, or light sensors. Surveillance information may also include information or data derived from the above information, or data received from an external source such as wireless stock ticker, traffic, GPS, or weather data.

In one or more embodiments, a capture node 400 may comprise a processor 304, memory 308, storage 312, power source 316, one or more transceivers 320, one or more antenna 324, or various combinations thereof as described above. Regardless of the configuration, a capture node 400 will generally include one or more capture devices 404 as one of its components in one or more embodiments. Once captured, surveillance information may be transmitted from the capture node 400 via its one or more transceivers 320.

A capture device 400 is a device configured to receive, record, or otherwise capture surveillance information. The capture device 404 may be integrated with one or more components of the capture node 400 in one or more embodiments. For example, the capture device 404 may be a video capture board. The capture device 404 may also be a stand alone device in some embodiments. For example, the capture device 404 may be a camera connected to the processor 304 of the capture node 400. It is contemplated that the capture device 404 may be movable (e.g. a pan, tilt, and zoom camera) to focus on specific events or areas periodically, in response to an event, or as desired.

As stated, there is a wide variety of surveillance information, and thus, a similarly wide variety of capture devices 404 are contemplated. To illustrate, the capture device 404 may also comprise one or more cameras, microphones, temperature sensors, radiation detectors, motion detectors. In addition, the capture device 404 may be a data input such as for receiving telemetry from other devices. For example, the capture device 404 may be a radio receiver configured to receive traffic, weather, GPS, or even stock ticker information. The capture device 404 may be a voltage or current sensor such as for detecting voltage or current usage or for detecting a completed circuit such as in contact sensors for security systems.

In one embodiment, the capture node 400 is configured to capture video surveillance information. As such, the capture node 400 has a capture device 404 comprising a video camera. The camera may be fixed or may have point, tilt, and zoom capability and may provide a video stream of a target area. Pan, tilt, and zoom cameras may be moved to focus on different areas as desired or according to a predetermined surveillance plan. In addition, such a capture node 400 may be programmed to automatically focus its camera (or other capture device) on an area in response to an event or notification or be remotely controlled such as through an external device or node in communication with the capture node 400.

In one or more embodiments, a capture node 400 may compress the surveillance information it is transmitting such as to save storage space, to save bandwidth for multiple streams of information, or to allow transmission of data across low bandwidth communication links. In one embodiment, a capture device 404 sends surveillance information to a processor 304 in the capture node 400. The processor 304 may process the surveillance information in a number of ways. For example, the processor 304 may analyze the information, as will be discussed further below, or may compress the information. In one or more embodiments, compression may occur through a compression algorithm or software comprising machine readable code stored on the memory 308, storage 312, or both. Any compression algorithm that can be executed by the processor 304 may be used. Some examples of compression algorithms for various types of data include: H.261, H.264, G.711, ZIP, LZIW, JPG, MPEG-1, MPEG-2, and MPEG-4. It is noted that the compression algorithm used will depend on the type of information to be compressed and the desired data rate, quality, or both of surveillance information after compression.

With regard to video surveillance, compression/decompression software known as a video codec, is used to accept analog video and then digitize, compress, and packetize it so it may be sent to its destination. Video compression and decompression requires significant hardware and software capabilities. In a worst case situation, where a video scene has simultaneous background and foreground scene complexity (e.g. shapes and patterns that are dissimilar in color, texture, shape, hue, etc . . . ) and simultaneous 3-axis camera movement (e.g. pan, tilt and zoom all at the same time), along with 3-axis target movement (e.g. a suspect or vehicle moving at or away from the camera at a diagonal), the codec may be required to process as much as 6,400,000,000 instruction sets per second or more. Traditional security industry codecs will drop frames or produce DCT (Discrete Cosine Transfer) blockiness, or both, when subjected to such harsh conditions because traditional codec simply cannot process the instructions quickly enough.

Furthermore, conversion from analog to digital is done in "real time" where massive amounts of analog data are converted to digital in real time. If the information cannot be processed quickly enough, some of the data is thrown away (e.g. dropped frames) during the compression process. The difference between the theoretical real time transformation and the actual transformation (the time delta) is called latency. A respectable latency (from the capture of video to its subsequent viewing) for 4 CIF images at 30 frames per second is under 180 milliseconds. If compression drops frames or introduces blockiness, the surveillance information is largely worthless.

Thus, in one or more embodiments, a capture node 400 may include an ASIC (Application Specific Integrated Circuit) to meet the video compression requirements defined above. For example one or some of the processors 304 of a capture node 400 may be ASICs designed to compress video according to one or more types of compression as discussed above. It is contemplated that video and other surveillance information may be compressed and decompressed through one or more ASICs and that other nodes, besides capture nodes 400, may utilize ASICs in one or more embodiments. It is contemplated that compression and/or decompression of surveillance information may be performed, as described herein, on any node of the peer to peer surveillance architecture.

Each capture node 400 may transmit multiple streams of video or other surveillance information, and each stream's network utilization may be managed differently. For example, a capture node 400 may set a first stream to 1 Mbps and UDP multicast, a second stream may be set for 256 kbps and unicast, and so on. The network utilization of each stream of surveillance information may be set based on network capabilities (e.g. available bandwidth) or other conditions such as the monetary cost of transmitting surveillance information over particular communication links. It is noted that other nodes 100 of the peer to peer surveillance architecture may transmit multiple streams of surveillance information as well.

In some embodiments, the capture node 400 may be configured to store captured surveillance information in addition to or instead of transmitting it. The surveillance information may be compressed prior to its storage and may be written to the capture node's 400 storage 312, such as magnetic, optical, or flash media, if desired. Various forms of storage 312 may be utilized as will be described further with regard to the content storage nodes of the invention. A capture node 400 may transmit live surveillance information, stored surveillance information, or both alone or simultaneously, if desired.

It is contemplated that capture nodes 400 may be configured to analyze surveillance information and provide one or more notifications if a particular event is detected. For example, a capture node 400 may be configured to execute analysis software. This software may execute on one or more processors 304 of the capture node 400. Analysis of surveillance information and notifications are described further below with regard to the server nodes of the invention.

In one embodiment, the capture node 400 may be a cellular node. In this embodiment, at least one transceiver 320 is configured to communicate through a cellular communication link or network. Cellular connections may have reduced or limited bandwidth and thus compression may be used to compress surveillance information before it is transmitted. Of course, where there is sufficient bandwidth, uncompressed surveillance information may be transmitted.

Video surveillance information from will generally be compressed prior to transmission over a cellular connection due to its higher bandwidth requirements. As stated above, video compression may require significant processing power to provide video with a high frame rate, no artifacts, and no dropped frames. This is especially so on reduced bandwidth connections such as cellular connections. Thus, it is contemplated that, in some embodiments, a cellular capture node 400, or other node having a cellular transceiver, may include an ASIC configured to compress video suitable for transmission over a cellular connection.

It is noted that a cellular transceiver 320 may communicate to other nodes 100 through the virtual matrix switch described above if desired. Thus, captured surveillance information may be unicast, multicast, or broadcast to other nodes 100 through a cellular connection. This is advantageous in a cellular connection (or other reduced bandwidth connections) because multicast or broadcast transmissions allow multiple or all the nodes 100 to receive the same surveillance information from a single transmission stream.

A cellular capture node 400, or other node having a cellular transceiver, also has the advantage of being capable of having network connectivity in remote locations because its cellular transceiver 320 may communicate over long distances wirelessly. Thus, it is contemplated that some embodiments of a cellular node may include one or more power sources 316 to allow the cellular capture node to operate without any wired connections. The cellular node may then be quickly and easily deployed nearly anywhere by simply placing it where it can capture surveillance information from one or more desired target areas.

Figure 5:
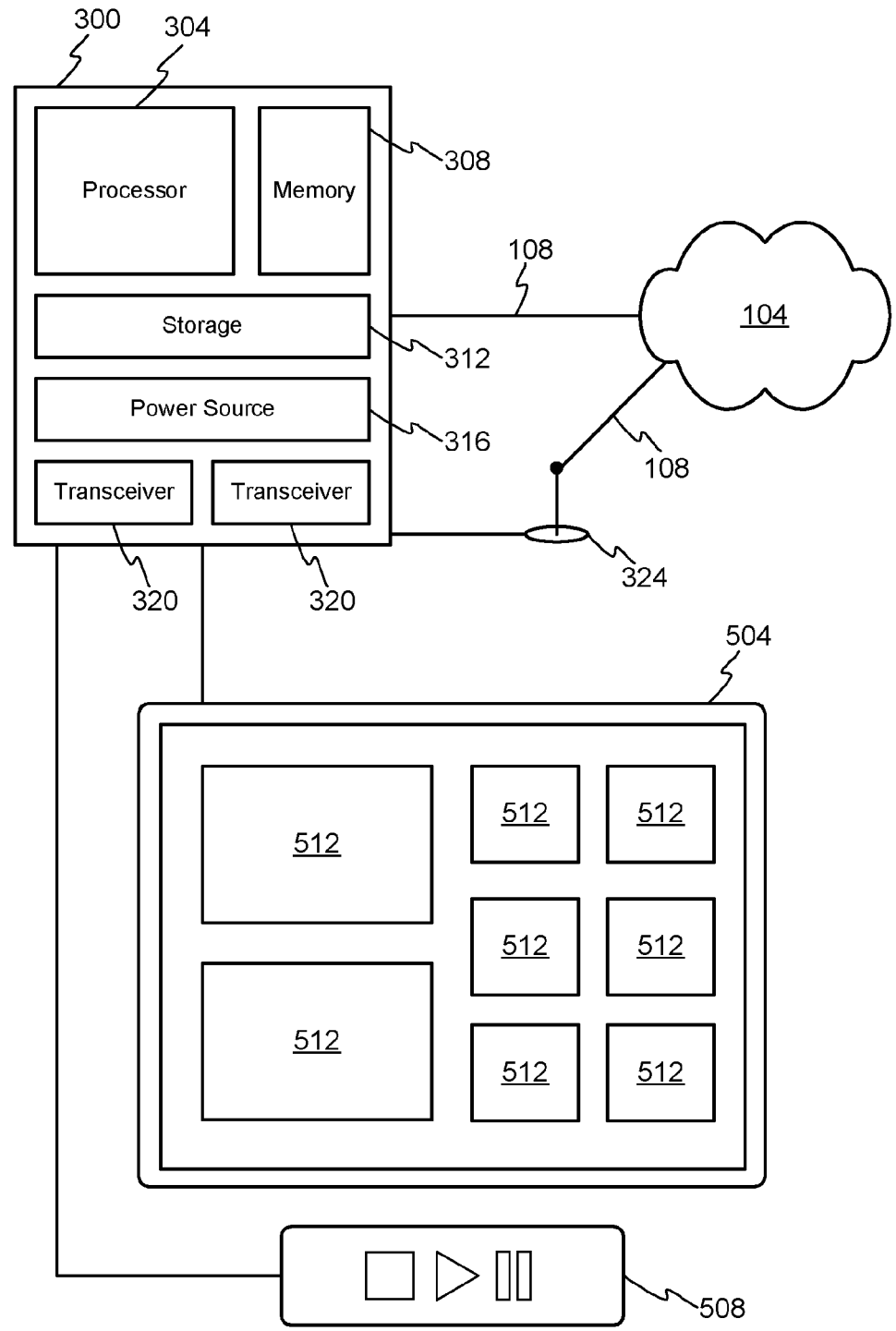
FIG. 5 is a block diagram illustrating an example embodiment of a viewing node.

FIG. 5 illustrates an embodiment of a viewing node 500. Generally, a viewing node 500 is used to view live and stored surveillance information as well as control playback of live or stored surveillance information. A viewing node 500 may also be used to select the surveillance information to be viewed as well as various representations or arrangements of the surveillance information. For example, the desired live or stored video surveillance from one or more nodes may be selected and viewed on the viewing node 500. In addition, the viewing node 500 may display other surveillance information in a table, graph, pie chart, text, or other arrangement.

It is contemplated that a viewing node 500 may also display or emit various alarms or warnings. For example, audible warnings, email alerts, and notifications of network or capture node failures may be presented visually or audibly via a viewing node 500. These alarms or warnings may result from one or more notifications transmitted by other nodes 100, as described below, and received by the viewing node 500.

In one or more embodiments, a viewing node 500 may comprise a processor 304, memory 308, storage 312, power source 316, one or more transceivers 320, one or more antenna 324, or various combinations thereof as described above. In addition, the viewing node 500 is a node and thus may comprise any configuration described above with regard to FIG. 3. A viewing node 500 may include one or more screens 504, control interfaces 508, or both as components in one or more embodiments. It is contemplated that a viewing node may be a personal computer (PC), smart phone (e.g. BlackBerry, iPhone), or personal media player in one or more embodiments. As these devices are nearly ubiquitous, a further advantage of the invention is that surveillance information from any node may be viewed virtually anywhere.

The screen 504 may be a high resolution color display such as a computer monitor or LCD screen. Any type of screen 504 may be used with the viewing node 500. This includes but is not limited to television monitors, black and white monitors, plasma and LCD screens, and projectors.

In some embodiments, surveillance information from other nodes 100 is displayed on a screen 504 in a viewing pane 512 comprising a portion of the screen. As stated, the nodes 100 may be various combinations of capture, server, storage, and other nodes described herein. It is contemplated that there may be one or more viewing panes 512 displayed on a screen 504 and that each viewing pane 512 may display surveillance information from one or more nodes 100. A user may be provided a list of nodes 100 and be allowed to select which node or nodes he or she wishes to view.

In one embodiment, the viewing panes 512 are displayed in various layouts such as 2×2, 3×3, 4×4, and 5×5. In other embodiments, the viewing panes 512 may be displayed according to a custom layout, such as shown in FIG. 5. For example, important viewing panes 512 may be displayed larger than other viewing panes. The viewing panes 512 to view may be selected from a list, map, or hierarchy of all available viewing panes. In addition, viewing panes 512 may be assigned to one or more groups and entire groups of viewing panes may be selected for viewing simply by selecting the desired group. This may be used to view surveillance information from an entire site or salvo of nodes 100.

In one or more embodiments, surveillance information will be received by the viewing node 500 through one or more transceivers 320 connected to one or more communication links 108. It is noted that each viewing node 500 may also transmit data such as to initiate communications with other nodes 100, request surveillance information, and control capture node cameras or other capture devices. The viewing node 500 may also output or export surveillance information so that it may be recorded by an external device. For example, video surveillance information may be exported to a video file, or may be output to a VCR, DVD, or other recording device or media for recording. It is contemplated that surveillance information may be exported to industry standard formats and be watermarked or signed to ensure its authenticity. Other nodes may also export surveillance information.

As stated, surveillance information may be uncompressed or compressed. Where the surveillance information is compressed, the viewing node 500 may decompress the surveillance information before it is viewed. This may occur by the processor 304 executing one or more decompression algorithms on the incoming surveillance information.

Of course, the proper decompression algorithm must be determined and such determination may occur by a handshake communication where one node notifies another of the algorithm it is using to compress information. The proper algorithm may also be determined by a node analyzing the incoming surveillance information. In some embodiments, a node may present the compression types it is capable of decompressing and the source node may select a compression algorithm accordingly. In essence, nodes may agree on which compression algorithm to use. It is contemplated that the communication of any type of surveillance information between any nodes of the peer to peer surveillance architecture may be facilitated by the handshake communication.

In addition to viewing panes 512, a viewing node 500 may display surveillance information on a timeline. In this manner, surveillance information is generally displayed according to the time it was captured or recorded. The timeline may have a resolution from one second to one month, but this range of resolution may be increased or decreased in one or more embodiments. The timeline provides the advantage of allowing surveillance information to be viewed together with the time it was capture or corresponding to other times. In this manner, more than one stream or type of surveillance information may be viewed such that any surveillance information for a particular time may be viewed together. For example, a video may be viewed synchronized with telemetry information, audio, or even other video. The timeline may be scrolled across the screen 504, or set to a specific start time, end time, or both.

In one or more embodiments, a viewing node 500 may include one or more control interface 508. A control interface 508 has the advantage of specific buttons, switches, or other controls not commonly found on a keyboard or mouse. In one embodiment, a control interface 508 may have media player type controls such as play, pause, fast forward, rewind, single frame advance or reverse, slow motion forward or reverse play, and stop. In addition a jog shuttle may be provided in some embodiments. The jog shuttle may be a circular knob which, when turned, allows fine control of the speed of the forward or reverse playback of surveillance information.

The playback or display of surveillance information on each viewing pane 512 may be individually controlled by the control interface 508. In addition, the controls may be used to control other aspects of viewing such as the volume of audio, or the magnification (i.e. zoom) of video. In one or more embodiments, signals comprising instructions to control the display of surveillance information, are generated from the operation of the control interface 508 and received by control interface's attached node.

In one embodiment, one or more of the viewing panes 512 is used to view video surveillance information. In this embodiment, available video surveillance information may be selected for viewing. The video surveillance information may be listed for selection with a text or other label, a thumbnail, or both. Each list item corresponds to the surveillance information provided by a particular node 100 or nodes. For example, a list item labeled "Building 10 Northeast Corner" may correspond to a capture or other node on the northeast corner of Building 10. Based on this, a user may then choose one or more videos for viewing as he or she desires. It is noted that other types of surveillance information may be similarly listed for selection with a text or other label, thumbnail, summary, or combination thereof.

In one or more embodiments, a viewing node 500 may be configured to store the last 30 seconds of surveillance information received by the viewing node on its storage 312, memory 308, or both. For example, the last 30 seconds of live video surveillance may be stored so that a user may easily review the last 30 seconds of events. In some embodiments, this storage of video or other surveillance information is temporary and may be more or less than 30 seconds if desired.

Figure 6:
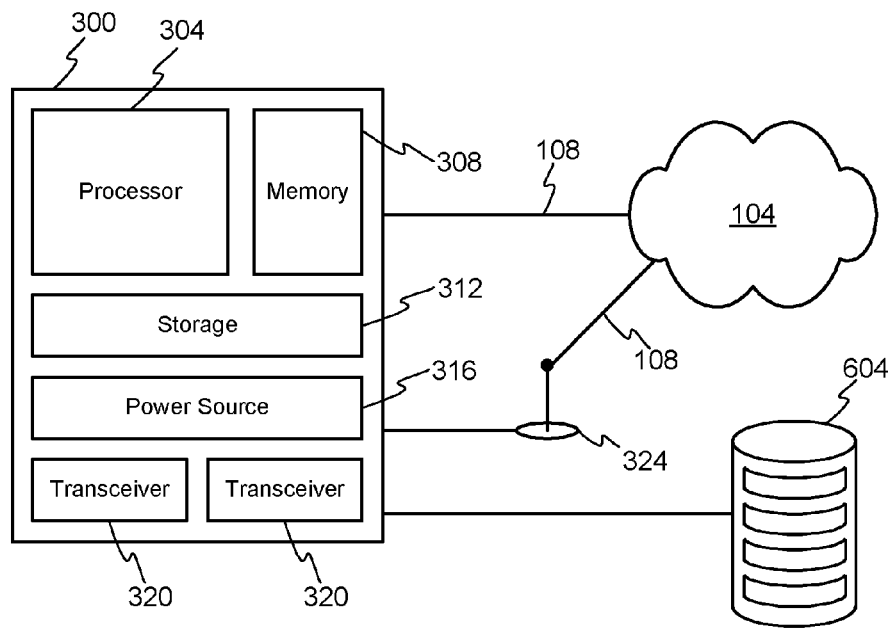
FIG. 6 is a block diagram illustrating an example embodiment of a content storage node.

FIG. 6 illustrates an embodiment of a content storage node 600. Generally, a content storage node 600 is configured to store surveillance information captured or transmitted from other nodes 100, and to transmit stored surveillance information to other nodes. These other nodes 100 may be any type of node including but not limited to capture nodes, viewing nodes, or even other storage nodes.

In one or more embodiments, a content storage node 600 may comprise a processor 304, memory 308, storage 312, power source 316, one or more transceivers 320, one or more antenna 324, or various combinations thereof as described above. Generally, content storage nodes 600 will include storage 312 to store the surveillance information received from other nodes 100.

The storage 312 in one or more embodiments is one or more hard drives. The hard drives may be configured in a RAID configuration, such as RAID 1 or RAID 5, in one or more embodiments. Of course various forms of storage 312 may be used. For example, the storage 312 may be internal or removable optical, magnetic, or flash media. In some embodiments, the storage 312 may be written to only once such as with DVD-R or CD-R technology. In other embodiments, the storage 312 may allow repeated reading and writing such as with a hard drive or other magnetic media.

A content storage node 600 is capable of storing both compressed and uncompressed surveillance information. For example, the content storage node 600 may receive compressed video from another node 100. Where compressed surveillance information is received it may be directly stored or, if desired, the content storage node 600 may decompress the information before it is stored. In addition, uncompressed surveillance information received by the content storage node 600 may be directly stored or compressed before it is stored. Compression will generally occur through one or more compression or decompression algorithms executed on the processor 304 as described herein. In addition, content storage nodes 600 may also go through a handshaking process with other nodes as described above. In this manner, the content storage nodes 600 may agree upon a compression/decompression algorithm for a particular transmission of surveillance information.

A content storage node 600 may be configured to transmit stored surveillance information in one or more embodiments. Surveillance information may be transmitted in compressed or uncompressed form regardless of how it has been stored. In addition, it is contemplated that surveillance information stored according to one type of compression may be recompressed with another type of compression prior to its transmission. This is advantageous in that it allows surveillance information to be compressed with another type of compression that may have reduced bandwidth requirements. In addition, some nodes may not support all compression types. Thus, the content storage node 600 may recompress surveillance information according to a compression type supported by the nodes it is communicating with. Of course, compressed surveillance information may be decompressed and transmitted as uncompressed surveillance information.

One advantage of a content storage node 600 is that surveillance information may be stored in multiple physical locations. For example, a capture node may transmit surveillance information to a plurality of content storage nodes 600 in various locations. In this manner, the surveillance information is preserved even if one or more of the content storage nodes 600 is damaged or destroyed. Similarly, surveillance information may be retrieved from multiple physical locations. For example, if connectivity to a geographic region, building, office, or other physical location is reduced or unavailable, the desired surveillance information may be retrieved from a content storage node 600 in a different physical location.

Figure 7:
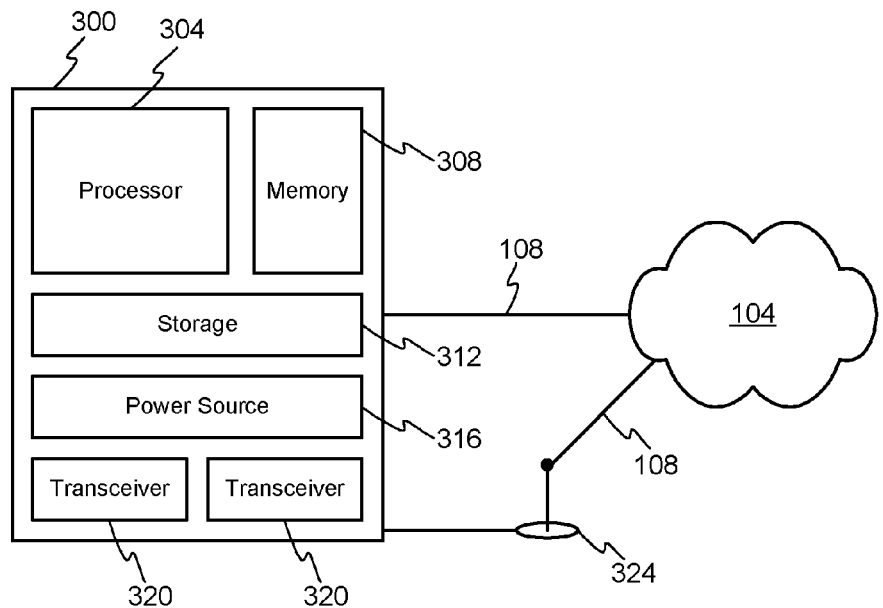
FIG. 7 is a block diagram illustrating an example embodiment of a server node.

FIG. 7 illustrates an embodiment of a server node 700. Generally, a server node 700 is configured to provide services related to authenticating access to and analyzing surveillance information. The server node 700 may be configured to authenticate requests for or access to surveillance information, analyze live or stored surveillance information, or both.

In one or more embodiments, a server node 700 may comprise a processor 304, memory 308, storage 312, power source 316, one or more transceivers 320, one or more antenna 324, or various combinations thereof as described above. In addition, the server node 700 is a node and thus may comprise any configuration described above with regard to FIG. 3.

In one embodiment, the server node 700 provides authentication capability. The server node 700 may use commercial software to accomplish this, such as Active Directory authentication in Microsoft Windows. Of course, the server node 700 does not have to utilize Active Directory as it is contemplated that any system, now known or later developed, where one or more user or other access accounts may be managed and authenticated through one or more server nodes 700 may be used with the invention.

In a peer to peer configuration, the server node 700 may validate a user's or a device's credentials and allow or deny access to the peer to peer surveillance architecture accordingly. In one or more embodiments, this may occur by the server node 700 returning a key or code which allows access to other nodes 100 of the surveillance architecture. Each node may be configured to respond only to one or more particular keys. It is contemplated that the keys may be generated through use of digital signatures, encryption, hashing algorithms, or both such as in a public key infrastructure.

The server node 700 may also be used to manage user or other access accounts such as by assigning access privileges or restrictions to a user other account or to a group of accounts. The privileges or restrictions may be set on the server node 700 to vary depending on the particular node 100 or group of nodes being accessed.

In embodiments of the peer to peer surveillance architecture where authentication is required for access, it is contemplated that a plurality of server nodes 700 providing authentication services may be used for redundancy. These server nodes 700 may be deployed in different physical locations to increase reliability as described above. It is contemplated that changes to user or other accounts may occur through any server node 700 which then may update other server nodes within the surveillance architecture accordingly.

In one embodiment each node 100 may be configured with one or more access codes or usernames and passwords which allow access to a node if correctly presented to the node. This embodiment does not require a server node 700 as each node 100 may authenticate access requests itself. One or more server nodes 700 may be utilized to manage user or other access accounts for each node 100 in this embodiment however.

One advantage of authentication is that each user or device may have their own accounts. This allows different access levels depending on the user or device and prevents the entire peer to peer surveillance architecture from being compromised if one or more access codes are revealed. Access codes may be changed as desired to further enhance the security of the surveillance architecture. Though this may be implemented at each node 100, use of one or more server nodes 700 providing authentication services has several advantages. One advantage is that accounts and access codes may be created, modified, or deleted at any server node 700. Each server node 700 may synchronize account and access code information to provide full redundancy for the authentication services.

Another advantage is that the server nodes 700 may be configured to log and audit access requests or other authentication activities. All user and system activity may be collected in the audit log along with the time at which the activity occurred. For example, a user's viewing of live or recorded surveillance information may be logged in the audit log. In this manner, a security audit may be performed on the peer to peer surveillance architecture to ensure its integrity. The audit log may be mirrored or copied to other server nodes 700, content storage nodes, or other nodes having storage for redundancy.

Server node based authentication is particularly useful in large surveillance architectures, such as city-wide surveillance architectures with hundreds to thousands of users and nodes. Managing access to individual nodes 100 may occur at each node, such as by setting up user or device accounts on each node. However, it is much easier to manage access to the nodes 100, especially in large surveillance architectures, from the one or more server nodes 700.

In one or more embodiments, a server node 700 may be configured to provide analysis of surveillance information it receives. This analysis will generally be performed through analysis software or machine readable code executing on one or more processors 304. With regard to video surveillance information, a server node 700 may accept an incoming video stream to detect motion. In addition, the server node 700 may have software capable of creating virtual tripwires, detecting objects that have been left behind by one or more subjects. Any analysis software may be used, and thus a variety of analysis may be performed including license plate and facial recognition. Software requiring specific video formats may be utilized as well because the server node 700 may request video of a specific format, such as a specific video format or compression type, from the other nodes 100. In addition, it is contemplated that the server node 700 may convert incoming video to a format usable by the analysis software if necessary.

The server nodes 700 may also provide analysis of other surveillance information. For example, weather information may be collected by various capture nodes and analyzed to track temperatures, wind speed, humidity, or other data for a geographic area. Each server node 700 may be configured to perform one or more analysis services of other server nodes 700. In this way, redundancy is provided for any analysis service used by the peer to peer surveillance architecture. In addition, one or more server nodes 700 may work together to analyze a particular stream or set of surveillance information. The results of the analysis of surveillance information may be stored on the server node 700, content storage nodes, or even other nodes.

In one or more embodiments, users may setup triggers which are activated when particular events are detected. For example, one or more server nodes 700 may be configured to notify one or more users when a particular event is detected. Notification may occur by email, phone, text messaging, on screen dialogs, sounds, or other methods. It is noted that each server node 700 may provide different analysis services and have different triggers and notification settings. One or more content storage nodes may be configured with analysis, triggering, and notification capabilities as well, in one or more embodiments.

In addition to notifying users, other nodes may be notified when particular events occur. For example, capture nodes with cameras may be notified to zoom in or focus on an area when a virtual tripwire is tripped or when a particular event is detected. Notification of another node may occur by one node communicating a notification message including information regarding an event to another node. The detection of an event includes recognizing animate or inanimate objects and may trigger further analysis by the same or one or more other server nodes 700. It is noted that any node may provide notification, such as for example, a node providing a notification of a communication link failure, or hardware or software failure.

It is contemplated that the peer to peer surveillance architecture may include one or more hybrid nodes in some embodiments. A hybrid node may combine components of the types of nodes described above. For example, in one embodiment, a capture node may include storage as described with regard to a content storage node, or vice versa. In other embodiments, the capture node may include a screen for viewing captured surveillance information, or may provide authentication services, analysis services, or both. In yet another embodiment, a viewing node may be configured to provide analysis services. The above listing of exemplary hybrid nodes is not intended to be exhaustive or limiting, as a wide variety of hybrid nodes may be formed from the components of the nodes disclosed herein.

As stated, peer to peer means that each node within the surveillance architecture operates independent from (i.e. does not rely on) its peer nodes. In traditional surveillance systems, a central control device or controller aggregates incoming surveillance information and, if so configured, also sends control instructions to its connected capture devices. This creates a single point of failure because each capture device relies on a single central controller in order to function. This also limits the number of capture devices and simultaneous users to the capacity of the control device. In contrast, the peer to peer surveillance architecture does not rely on any central control device as each node is independent.

To illustrate, failure to receive video surveillance from a surveillance camera can be due to various causes. For example, the cable from the camera may be damaged, the device receiving video surveillance may malfunction, or the camera itself may be malfunctioning. In a traditional system with central control, any one of these problems prevents the capture and use of surveillance information because the central controller is not receiving any surveillance information.

With the invention herein: where there is a damaged cable, a capture node may utilize one or more redundant communication links; where a viewing node is malfunctioning, a user may simply use another viewing node; and where the capture node is malfunctioning a redundant capture node at the same location may be used. As stated, a viewing node may be a PC, smart phone, or personal media player in one or more embodiments, and thus, switching to another viewing node is easily accomplished within the peer to peer surveillance architecture.

Furthermore, capture nodes may store the surveillance information they capture or transmit to other nodes for analysis, storage or both. Thus, in the unlikely event that a user cannot view surveillance information through a viewing node, the captured surveillance information is not lost. Though the user is temporarily unable to view the surveillance information, he or she may still be notified by one or more server nodes analyzing the information for particular occurrences, and the information may be stored for later review by the user.

It is noted again that, users and viewing nodes (and any other node) may be in different geographic locations and use more than one completely independent network to communicate. Thus, the failure of a cable or even an entire network in one or more locations does not prevent the peer to peer surveillance architecture from operating. For example, a single node may have a cable Internet connection, a cellular connection, and an ISDN connection.

The nodes themselves may have redundant components. For example, a capture node may have more than one camera or other capture device, or a content storage node may be configured with a RAID storage array. It is contemplated that a node may be configured such that each component has a backup or redundant counterpart. Such redundancy is not available in traditional systems.

A highly available surveillance system includes devices that have a high Mean Time Between Failure (MTBF), and Mean Time Between Critical Failure (MTBCF). As discussed above, the peer to peer relationship between nodes ensures no loss of service during a node, communication, or network failure. However, after a failure and until the failed node, communication link, or network is fully operational the peer to peer surveillance architecture may be operating under less than optimal conditions. For example, redundant communication links may have less bandwidth and more latency, or be more expensive. Also, where there already has been a failure, an additional failure may result in loss of surveillance capability. Thus, the peer to peer surveillance architecture provides another advantage in that it has a low Mean Time To Repair (MTTR) in one or more embodiments.

As an initial matter, the nodes themselves may be configured with components having a high MTBF and MTBCF to reduce failures and the need for repairs. Various node configurations, protective components, and enclosures may be used to protect node components from environmental threats which may lower a component's MTBF or MTBCF, such as high or low temperatures, power surges, lightning, and humidity.

In addition, nodes may be configured to allow access by qualified technical or other personnel. This access to a node is highly advantageous in maintaining and repairing individual nodes. In one or more embodiments, operating information including information regarding hardware and software abnormalities or failures may be stored by the nodes. This information can be used to prevent node failures, such as by allowing preventative maintenance to occur, as well as to optimize node performance. It is contemplated that the nodes may have internal diagnostics and may allow technicians or other personnel to access operating information, change hardware or software settings, or run diagnostics through a diagnostic connection with the node. The diagnostic connection may be authenticated and occur through one or more communication links, networks, or a combination thereof as discussed above.

The diagnostic connection allows quick diagnosis over a remote or direct connection to reduce a node's MTTR. Repairs, such as changing hardware or software settings may be implemented through the diagnostic connection as well. Where replacement hardware is necessary, the diagnostic connection may be used to quickly identify what hardware to be replaced.

It is noted that, because the nodes are independent, a repair may occur simply by replacing a damaged node with a new one. While the new node is in place, the damaged node may be diagnosed and repaired. It is contemplated that configuration settings for a node may be saved external to the node or exported from the node and imported into a similarly configured node to allow for rapid replacement of individual nodes.

In one or more embodiments, diagnosis of software or hardware issues may occur through one or more diagnostic routines or programs. Generally, these routines or programs input data into one or more of a node's components and confirm that the corresponding output from the components is as expected or within an acceptable range for a properly functioning component.

The peer to peer surveillance architecture has another advantage in that maintenance updates or upgrades may be performed without impacting the overall surveillance architecture. This is because each node may be individually updated or upgraded without interrupting the operation of any other node. It is noted that, in contrast to an unplanned failure, updates and upgrades may be planned in advance so as to occur when operation of a particular node is not crucial. Updates include firmware or other software updates for a node's components, and may include replacement of components with new revisions of the same. Upgrades generally may be thought of as software or hardware replacements that increase the node's or a particular component's capabilities or capacity, reduce power consumption, or provide other benefits.

Finally, it is noted that the invention herein is a peer to peer surveillance architecture. Though each node, regardless of its type, functions independently of its peer nodes, each type of node (except hybrid nodes) is necessary to provide the full functionality of the surveillance architecture according to the invention herein. Thus, each node may function independent of any other node, however, the full functionality of the invention may not be realized by any single node acting alone.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A peer to peer surveillance system comprising:
   a plurality of independently accessible peer to peer nodes comprising:
   multiple capture nodes that each have one or more video cameras configured to capture surveillance information, and one or more transceivers configured to transmit the surveillance information;
   wherein the multiple capture nodes are each configured to directly transmit the surveillance information to a viewing node, wherein the surveillance information is directly transmitted to the viewing node without being transmitted via a central server node and without being transmitted via any other of the peer to peer nodes;
   wherein each of the multiple capture nodes communicates via multiple communication links, such that failure or damage to one of the multiple communication links does not cause the surveillance architecture to function at less than full capacity; and
   wherein one of the multiple capture nodes is a hybrid node that includes a non-volatile storage device and that is configured to:
   receive surveillance information from other capture nodes; and
   persistently record the received surveillance information on the storage device,
   wherein the multiple capture nodes that are not the hybrid node are configured to directly transmit surveillance information to the hybrid node for storage, wherein the surveillance information is directly transmitted to the hybrid node without being transmitted via a central server node and without being transmitted via any other of the peer to peer nodes.

2. The surveillance system of claim 1, wherein the plurality of peer to peer nodes further comprises at least one content storage node having a storage device for storing at least some of the surveillance information, wherein the at least one content storage node is configured to receive an authentication key from a viewing node, and communicate the at least some of the surveillance information to the viewing node after receiving the authentication key from the viewing node.

3. The surveillance system of claim 1, wherein one or more of the multiple capture nodes is configured to analyze surveillance information to detect one or more events and transmit one or more notifications if the one or more events is detected.

4. The surveillance system of claim 1, wherein the plurality of peer to peer nodes are configured to transmit the surveillance information through one or more communication links in a plurality of streams, whereby a first stream of surveillance information consisting of video is transmitted via multicast while one or more second streams of surveillance information are transmitted via unicast.

5. The surveillance system of claim 1, further comprising an authentication service configured to receive access credentials from a viewing node, and to generate and subsequently transmit an authentication key to the viewing node after successfully verifying the access credentials received from the viewing node.

6. The surveillance system of claim 5, wherein the viewing node is configured to transmit the authentication key to any of the multiple capture nodes, and wherein the multiple capture nodes are configured to communicate the surveillance information to the viewing node after receiving the authentication key from the viewing node.

7. The surveillance system of claim 1, wherein the wherein the capture nodes are configured to agree, during a handshake communication, on a compression algorithm and to utilize the agreed-upon compression algorithm when communicating with one another.

8. A peer to peer surveillance system comprising:
   a plurality of independently accessible peer to peer nodes comprising:
   multiple capture nodes that each have one or more video cameras configured to capture surveillance information, and one or more transceivers configured to transmit the surveillance information;
   wherein the multiple capture nodes are each configured to directly transmit the surveillance information to a viewing node, wherein the surveillance information is directly transmitted to the viewing node without being transmitted via a central server node and without being transmitted via any other of the peer to peer nodes;

wherein each of the multiple capture nodes is housed in an enclosure that includes the one or more video cameras and the one or more transceivers, wherein the enclosure is mounted on a corresponding support structure; and wherein one of the multiple capture nodes is a hybrid node that includes a non-volatile storage device and that is configured to:

receive surveillance information from other capture nodes; and persistently record the received surveillance information on the storage device, wherein the multiple capture nodes that are not the hybrid node are configured to directly transmit surveillance information to the hybrid node for storage, wherein the surveillance information is directly transmitted to the hybrid node without being transmitted via a central server node and without being transmitted via any other of the peer to peer nodes.

9. The surveillance system of claim 8, wherein the enclosure housing each of the multiple capture nodes includes one or more portable power sources secured within the enclosure.

10. The surveillance system of claim 8, wherein the plurality of peer to peer nodes further comprises at least one content storage node having a storage device for storing at least some of the surveillance information, wherein the at least one content storage node is configured to receive an authentication key from a viewing node, and communicate the at least some of the surveillance information to the viewing node after receiving the authentication key from the viewing node.

11. The surveillance system of claim 8, wherein one or more of the multiple capture nodes is configured to analyze surveillance information to detect one or more events and transmit one or more notifications if the one or more events is detected.

12. The surveillance system of claim 8, wherein the plurality of peer to peer nodes are configured to transmit the surveillance information through one or more communication links in a plurality of streams, whereby a first stream of surveillance information consisting of video is transmitted via UDP multicast while one or more second streams of surveillance information are transmitted via TCP/IP unicast.

13. The surveillance system of claim 8, wherein each of the multiple capture nodes communicates via multiple communication links, such that failure or damage to one of the multiple communication links does not cause the surveillance architecture to function at less than full capacity.

14. The surveillance system of claim 8, further comprising an authentication service configured to receive access credentials from a viewing node, and to generate and subsequently transmit an authentication key to the viewing node after successfully verifying the access credentials received from the viewing node.

15. The surveillance system of claim 8, wherein the capture nodes are configured to agree, during a handshake communication, on a compression algorithm and to utilize the agreed-upon compression algorithm when communicating with one another.

16. A peer to peer surveillance system comprising:
a plurality of independently accessible peer to peer nodes comprising:
multiple capture nodes that each have one or more video cameras configured to capture surveillance information, and one or more transceivers configured to transmit the surveillance information; and
an authentication service configured to receive access credentials from a viewing node, and to generate and subsequently provide an authentication key to the viewing node after successfully verifying the access credentials received from the viewing node, wherein the viewing node further provides analysis services; and
wherein the multiple capture nodes are each configured to directly transmit the surveillance information to the viewing node, wherein the surveillance information is directly transmitted to the viewing node without being transmitted via a central server node and without being transmitted via any other of the peer to peer nodes; and
wherein one of the multiple capture nodes is a hybrid node that includes a non-volatile storage device and that is configured to:
receive surveillance information from other capture nodes; and
persistently record the received surveillance information on the storage device,
wherein the multiple capture nodes that are not the hybrid node are configured to directly transmit surveillance information to the hybrid node for storage, wherein the surveillance information is directly transmitted to the hybrid node without being transmitted via a central server node and without being transmitted via any other of the peer to peer nodes.

17. The surveillance system of claim 16, wherein the authentication service is provided by the viewing node.

18. The surveillance system of claim 16, wherein the analysis services of the viewing node are configured to analyze video surveillance information to detect motion, identify objects, and/or recognize faces.

19. The surveillance system of claim 16, wherein the viewing node includes a transceiver to receive surveillance information transmitted from the multiple capture nodes, and at least one screen configured to present the surveillance information.

20. The surveillance system of claim 16, wherein the viewing node is configured to transmit the authentication key to any of the multiple capture nodes, and wherein the multiple capture nodes are configured to communicate the surveillance information to the viewing node after receiving the authentication key from the viewing node.

21. The surveillance system of claim 16, wherein the plurality of peer to peer nodes further comprises at least one content storage node having a storage device for storing at least some of the surveillance information, wherein the at least one content storage node is configured to receive an authentication key from a viewing node, and communicate the at least some of the surveillance information to the viewing node after receiving the authentication key from the viewing node.

* * * * *